United States Patent [19]

Capuano

[11] Patent Number: 4,711,163

[45] Date of Patent: Dec. 8, 1987

[54] ACETIC ACID FERMENTATION PROCESS AND APPARATUS

[76] Inventor: Giuseppe Capuano, Via Miliscola 131, Arco Felice (Pozzvoli), Italy

[21] Appl. No.: 870,475

[22] Filed: Jun. 4, 1986

[51] Int. Cl.$^4$ ............................................. A23L 1/18
[52] U.S. Cl. ........................... 99/323.12; 99/323.1; 426/17; 435/311; 435/313; 435/315; 435/316
[58] Field of Search .................... 99/277.1, 277.2, 276, 99/277, 323.1, 323.2, 323.12, 278; 426/17; 435/313, 315, 318, DIG. 813, 3, 140, 314

[56] References Cited

U.S. PATENT DOCUMENTS

| | | | |
|---|---|---|---|
| 2,586,133 | 2/1952 | Wilken | 99/277.2 |
| 2,997,424 | 8/1961 | Mayer | 435/140 |
| 3,014,804 | 12/1961 | Els | 426/17 |
| 3,252,870 | 5/1966 | Braun | 435/140 |
| 3,445,245 | 5/1969 | Ebner | 426/17 |
| 3,531,373 | 9/1970 | Eder | 435/3 |
| 3,681,200 | 8/1972 | Ridgway | 435/314 |
| 4,216,711 | 8/1980 | Skoli et al. | 99/277.2 |
| 4,569,845 | 2/1986 | Nodes | 426/17 |

Primary Examiner—Robert W. Jenkins
Attorney, Agent, or Firm—Nilsson, Robbins, Dalgarn, Berliner, Carson & Wurst

[57] ABSTRACT

An apparatus and process for the aerobic oxidative fermentation of an unpreserved wine where the growth of the resident bacteria in the wine is promoted to produce a fermenting wine mixture to which subsequently lesser quantities of unpreserved wine can be succeedingly added and withdrawn.

16 Claims, 8 Drawing Figures

ACETIC ACID FERMENTATION PROCESS AND APPARATUS

BACKGROUND OF THE INVENTION

The present invention is directed to the fermentation of acetic acid by the aerobic oxidation of ethanol. Specifically, the present invention is directed to an apparatus and process for the oxidative acetic acid fermentation of an unpreserved wine.

The commercial production of vinegar, which is an acetic acid containing liquid from wines is of widespread use. The typical process of fermenting wines involves the aerobic oxidation of the ethanol to acetic acid. This aerobic oxidation of ethanol is carried out in most commercial processes by acetic acid bacteria, such as those of the genera acetobacter. These types of bacteria naturally occur on various surfaces of plants, such as flowers and fruits. These types of bacteria develop as a secondary microflora on decomposing plant material following the conversion of sugars to ethanol by yeasts. The acetic acid bacteria utilize ethanol as a substrate upon which to grow.

The viability of the acetic acid bacteria is dependent upon not only the presence of a sufficient concentration of ethanol but also upon a sufficient concentraton of oxygen. If either the ethanol or the oxygen become limited the viability of these types if bacteria is seriously impaired. Furthermore, these types of bacteria are also highly temperature sensitive, which affects their productivity and the coversion of ethanol to acetic acid. Thus any commercial process which utilizes these acetic acid bacteria must take into account these requirements.

One particularly widely used commercial process involves the batch preparation of vinegar, an acetic acid containing liquid from wine. In a batch operation, the wine is charged into a vat. Typically, the quantity of wine which will undergo fermentation is anywhere from 3000 to 20,000 liters. As already stated, one of the requirements of the aerobic bacteria is the concentration of available oxygen. A batch type operation requires that air or other oxygen-containing gas be pumped into the liquid. This requirement for pumping an oxygen-containing gas into the liquid is necessitated because the transportation of gas across the liquid-air boundary of a large volume of wine in the vat is not sufficient for purposes of maintaining a viable bacterial culture.

Furthermore, the aerobic oxidation of ethanol to acetic acid by the bacteria is a highly exothermic process. As stated, acetic acid bacteria are highly temperature sensitive. It has thus been found in the commercial production of acetic acid that the fermentating wine must be sufficiently cooled so as to maintain the viability of bacteria.

Examples of presently available commercial type fermentators are disclosed in U.S. Pat. Nos. 2,997,424, issued to Mayer; 3,014,804, issued to ELs et al; 3,252,870, issued to Braun et al; 3,445,245, issued to Ebner; 3,531,373, issued to Eder; 3,681,200 issued to Ridgway; and 4,569,845 issued to Nodes. Generally, such disclosed apparatus inject air into the liquid using a rotating impeller type mechanism which is located at the bottom of the fermentation vessel. These rotating impeller mechanisms not only introduce air into the wine but establish an upperly spiralling rotation in the wine. This spiralling movement in the wine mixes and disperses the air into the wine.

As illustrated in some of the above identified patent references, a mechanism is typically positioned in the fermentation vessel to cool the wine during the fermentation process which, as stated, is exothermic. The most typically utilized mechanism is a spirally configured pipe through which a cooling wine is directed. The spiral of the pipe compatibly conforms to the spiralling movement of the wine created by the rotating impeller aerator. Thus the overall spiralling movement of the wine is not impaired by the cooling mechanism.

A major disadvantage with these types of acetic acid fermentators is the limited degree of mixing due to only creating a spiralling circulation of the wine. It has been found that this uniform spiralling circulation of the wine does not thoroughly disperse the air. This is due to the presence of areas of low circulation found outside the upperly spiralling circulation area of the wine. This establishes areas of low air concentration which may be less than necessary to sustain the viability of the bacteria. If the viability of the bacteria becomes seriously impaired, death of such bacteria will occur. The death of bacteria creates a potential for the production of foam at the surface of the wine. The establishment and production of this foam is highly undesirable since it impairs the overall quality of the produced acetic acid liquid, and impairs the overall efficiency of the fermentating process.

In order to compensate for the production of foam by this inefficient aeration of the wine, many commercial devices utilize defoamers. These defoamers continually skim or remove in some manner the foam being generated at the surface of the wine. Examples of such foam removal devices are disclosed in the Ebner (3,445,245) and Nodes (4,569,845) patent references.

Another disadvantage with presently available fermentators is the manner by which the fermentation process is initiated. Generally, the processes disclosed by the above referred to patents require the addition to the wine of a separately prepared culture of the desirable acetic acid bacteria. This prepared culture is used to seed the fermentation reaction in the vessel. Typically, the fermentating vessel is charged with a desirable amount of a wine and a seed bacteria culture. The operation of the process is then initiated by aerating and regulating the temperature of the wine to maintain the viability of the bacteria added to the wine.

Some of the processes disclosed by the above referred to patent references then utilize the fermenting wine as a seed culture for subsequent fermentations. In other words, after the fermentation of the initial wine has been completed, a quantity of the now fermented wine is discharged from the fermentation vessel. This discharged quantity is slightly less than the initial quantity charged to the vessel. This leaves a small volume of the already fermented wine in the vessel. More wine is then charged to the vessel with the already present fermented wine now acting as the seed culture. In this manner, successive fermentations may be carried out after a seed culture liquid has been established in the fermentator.

The use of the independently prepared seed culture of a desired bacteria is costly and time consuming. Furthermore, use of a seed culture, including the use of a previously fermented wine as the seed culture, for each successive fermentation process requires that in each succeeding fermentation the concentration of bacteria in the wine must first be sufficiently increased before a substantial conversion of the ethanol to acetic acid will occur. This initial start-up requires a substantial amount of time until the desired concentration of the bacteria is established in the liquid to efficiently carry out the fermentation process.

Another disadvantage with the presently available fermentators is in the loss of ethanol and acetic acid during the fermentation process. As already discussed, it is essential that the bacteria in the fermentating wine be exposed to a sufficient quantity of air. This is achieved not only by the aeration but by the mixing of the liquid in the fermentator. As the wine is more violently mixed and/or the amount of air being introduced is increased, there will be evaporation of this air at the surface of the wine. Furthermore, as the air passes through the fermenting wine, it will pick up ethanol and/or actic acid. Thus the air passing through and evaporating off the wine carries with it ethanol and/or acetic acid.

All of the disclosed fermentators vent the exhaust gas out of the fermentator. This exhaust gas thus carries with it some ethanol and/or acetic acid which reduces the overall efficiency of converting the initial concentration of ethanol to acetic acid. As will be more fully discussed herein, it has now been determined that this loss of ethanol, and thus acetic acid in the final wine affects the quality of the fermentated liquid produced, i.e. vinegar. It has been determined that the overall organoleptic characteristics, as well as the taste of the resulting fermentated vinegar, is impaired by this loss of the ethanol and/or acetic acid. This disadvantage has not heretofore been recognized in the art.

This phenomenon of the ethanol bein present in the exhaust gas has been utilized in some presently available fermentators to monitor the fermentation process. The exhaust gases, those gases evaporating and/or passing through the wine, are directed through an analyzer. This analyzer measures the ethanol concentration in the air. As the concentration of the ethanol in the wine decreases the concentration of the ethanol in the exhaust gases correspondingly decreases. Once the ethanol concentration reaches a predefined level the fermentation process is stopped and a desired quantity of the fermentated wine is drawn out of the vessel. This concentration level is typically when the ethanol concentration in the wine, and in the air reaches about 0.3 volume percent. At this concentration level, the activity, and thus the concentration of the bacteria, in the fermentating wine is at a maximum. If the fermentation continues beyond this point, there exists the possibility of bacterial death due to the low level of ethanol in the substrate wine. This bacterial death creates the potential for foaming as discussed above. Thus it has been found that once this particular concentration level of the ethanol is achieved, the process should be terminated and the wine withdrawn from the vessel. After the exhaust gas has been analyzed, it is vented into the surrounding atmosphere.

In the Braun et al (3,252,870) patent reference, a cyclone separator is positioned in the exhaust line of the fermentator. This cyclone separator removes any liquid droplets present in the exhaust gas prior to the exhaust being introduced into a plate column gas washer. The exhaust gas is stripped of soluble vapors in this washer. However, the washing liquid containing the soluble components of the waste gas is discharged from the apparatus. Thus, the ethanol and/or acetic acid which is carried by the exhaust gas are not returned to the wine undergoing fermentation.

There thus remains a need to provide a fermentation process and useful apparatus which do not possess the disadvantages discussed above. A process and useful apparatus of this type should provide for a sufficient enough aeration and dispersal of an oxygen containing gas into the wine to initiate and maintain bacterial growth without the disadvantage of a substantial loss of ethanol and/or acetic acid. This type of process and useful apparatus should also provide for a multidirectional circulation of the wine to uniformly disperse the oxygen-bearing gas. Furthermore, the process of the invention should provide that the time necessary for successive fermentation should be reduced in order to provide a more economical system.

SUMMARY OF THE INVENTION

The present invention accomplishes these objectives by providing a process and useful apparatus wherein the growth of naturally occurring resident bacteria in an unpreserved is initiated and maintained to cause the oxidative fermentation of ethanol to acetic acid. The process and apparatus further provide for the return of substantially all of the ethanol and/or acetic acid which evaporate off of the liquid with the exhaust gas.

In acordance with the invention, a first quantity of wine is subjectd to the process until substantially all of the ethanol is oxidized to acetic acid. At this point, an additional lesser quantity of the wine is gradually added to the already fermented wine. After the second quantity of wine has been subjected to the fermentation process for a sufficient amount of time to provide that substantially all of the ethanol has been oxidized, this amount of wine is drawn off. This process can be repeated by successive additions and withdrawals of a lesser quantity of wine to the already fully fermented wine. This significantly reduces the time necessary to carry out the fermentation process.

DESCRIPTION OF THE DRAWINGS

The present invention may be better understood, and its numerous objectives and advantages will become apparent to those skilled in the art, be reference to the accompanying drawings, wherein like reference numerals refer to like elements in the several figures, and wherein.

DESCRIPTION OF THE PREFERRED EMBODIMENTS

The present invention is directed to an apparatus and method for the aerobic oxidative fermentation of ethanol to acetic acid.

The apparatus and process of the invention utilize acetic acid bacteria for the aerobic oxidation of ethanol to acetic acid. These acetic acid bacteria naturally occur on the surface of plants, particularly upon the flowers and fruits. The bacteria develop abundantly as a secondary microflora on decomposing plant material under aerobic conditions. This secondary acetic acid bacteria growth is due to the initial alcohol fermentation of sugars by yeasts. It is believed that these acetic acid bacteria use ethanol as an oxidizable substrate, converting the ethanol to acetic acid. There are two genera of acetic acid type bacteria, Gluconobacter and acetobacter. The present invention is directed to the utitization of this naturally occurring acetic acid bacteria in an efficient and economical manner for the aerobic oxidation of ethanol to acetic acid.

In accordance with the process of the invention, the naturally occurring resident bacteria present in an unpreserved wine is utilized to initiate the fermentation process.

As used herein, "unpreserved wine" shall mean the product of the alcoholic fermentation by yeasts of a plant product, e.g., fruit, which has not been subjected to any preservation and/or sterilization process. By "resident" bacteria, it is meant that bacteria which is naturally present in the unpreserved wine after this wine has undergone alcohol fermentation. In this manner the wine retains a sufficient enough concentration, for the purposes of the present invention, of a suitable acetic acid bacteria. It is believed that the utilization of the resident bacteria has not been made heretofore because the previously utilized processes did not establish a sufficient environment in the wine to allow the resident bacteria to flourish quickly enough to provide an economical acecic acid fermentation system. It is thus an aspect of the process and apparatus of the invention to provide such an environment in which the resident bacteria can flourish to provide a fermentating wine, wherein the ethanol present is aerobically oxidized to acetic acid.

In accordance with the process of the invention, a first defined quantity of an unpreserved wine is subjected to a sufficient enough aeration process to homegenously disperse the gas throughout the wine. This aeration and dispersal of the gas provides that the wine becomes substantially saturated with the oxygen-bearing gas, which for practical purposes is typically air. This aeration and dispersal step involves introducing the air into the wine at a given rate, which rate has been determined to be most effective for the purposes of the invention when using about four meters$^3$ for every 1000 liters of wine per hour. Furthermore, the wine is simultaneously mixed in a manner to provide a multidirectional circulation of the wine. That is, the wine will be circulated in numerous different directions simultaneously.

Preferably, this multidirectional circulation is provided by causing the wine to circulate in a longitudinally spiralling manner at a desired number of revolutions per minute (rpm) and causing the wine at the longitudinal periphery of spiralling wine to be diverted substantially radially inward. This causes the multidirectional mixing as a result of the interaction of the two circulation patterns. Preferably, the spiralling circulation is initiated by rotating the wine in a localized area at about 1000 rpm.

As the wine is being aerated and mixed in this manner, the resident bacteria present in the wine will begin to flourish. As the bacteria flourish, the rate of fermentating the ethanol to acetic acid increases. As described above, this fermentation process is very exothermic. It has been found that if the wine is allowed to be heated above a certain temperature that the continued growth of the bacteria will be impaired. This impairment of the bacterial growth reduces the efficiency and economy of the process. Thus in accordance with the process of the invention the wine is maintained at a temperature less than or equal to about 35° C. This step of maintaining the temperature of the wine can be initiated when the temperature of the wine begins to increase. For practical purposes, this temperature maintenance is initiated with the aeration and mixing of the wine.

As stated above, as the gas is introduced and dispersed through the wine it will pick up, or vaporize some of the present ethanol and/or acetic acid. As the wine becomes saturated, some of this gas will begin to evaporate off, or pass through the wine at the air-liquid boundary surface of the wine. This "exhaust" gas will typicall carry with it a concentration of the ethanol and/or acetic acid which is relatively equivalent to that present in the wine. Even though the total quantity of air which is exhausted from the wine is relatively small in comparison to the total volume of the wine, over an extended period of time a substantial percent of ethanol and/or acetic acid can be lost. Presently available oxidative fermentation apparatus and processes, e.g., as exemplified by the above referred to patents, have not been concerned with this eventual loss of a given percent of ethanol and/or acetic acid. However, it has now been determined that the overall characteristics of the final fermented product, in this case vinegra, is affected by this loss of the ethanol and/or acetic acid. The present invention recognizes that the organoleptic properties and taste of the final product are substantially affected by this loss. It is thus an aspect of the process and apparatus of the invention to minimize the overall loss of ethanol and/or actic acid.

In order to minimize the loss of a substantiall amount of the ethanol and/or acetic acid, the gases which exhaust off of the fermentating wine are acted upon to return substantially all of any ethanol and/or acetic acid present to the fermenting wine. This process step is typically carried out by cooling the exhaust gases to a temperature sufficient enough to condense the ethanol and/or acetic acid vapors and/or entrained liquid out of the exhaust gas. Typically, this temperature is less than or equal to about 10° C., preferably from about 0° to 10° C., more preferably from about 5° C. to about 10° C. and, still more preferably about 10° C. The ethanol and/or acetic acid, and any other material condensed out of the exhaust gases are returned to the fermenting wine.

This step of returning the ethanol and/or acetic acid from the exhaust gas to the fermenting wine will, for practical purposes, can be initiated at the outset of the process. This ensures that substantially all of the ethanol initially present in the wine is subjected to the oxidative fermentation and converted to acetic acid. It has been found that by the process of the present invention, substantially all, i.e. from about 90 to 95 percent, of the initially present ethanol is converted to to acetic acid.

Thus, for the sake of practicality, the steps of aerating and dispersing the oxygen-bearing gas through the wine, maintaining the temperature of the wine and returning the ethanol and/or acetic acid from the exhaust gases to the fermentating wine are initiated substantially simultaneously.

After a lapse of a period of time, sufficient enough to establish a substantial fermentation in the wine, a second lesser quantity of wine is slowly added to this fermenting first quantity of wine in a manner which does not impair the aeration or cooling of the wine. A substantial fermentation is established in the wine once the ethanol concentration in the fermenting wine reaches a predefined level. At this point, the wine is slowly added. The analysis of the ethanol concentration in the wine can be determined by any suitable procedure or device and is not critical to the invention. Preferably this concentration level is when the ethanol concentration in the wine reaches about 0.3 volume percent. At this concentration level, it has been found that the activity, and thus the concentration of the bacteria, in the fermentating wine is at a maximum. When the bacteria population is at its maximum, the fermentation of the additional wine will be most rapid. As will be discussed below, the amount of time necessary to reach this point in the process is dependent upon the rate of the oxygen dispersal into the wine. The quicker the wine is saturated with the oxygen bearing gas, the quicker the fermentation process will be initiated and proceed.

It should be noted that if the fermentation is allowed to continue beyond the point when the ethanol concentration reaches 0.3 volume percent, there exists the possibility of bacterial death due to the low level of ethanol in the wine. This bacterial death creates the potential for foaming which, as discussed above is undesirable. After the second quantity of wine has been added, the process is continued for a sufficient period of time to allow for the substantial conversion of the ethanol to acetic acid. This second period of time is again preferably when the overall concentration of the ethanol in the wine is equal to about 0.3 volume percent.

When this ethanol concentration is reached, a quantity of the fermented wine is withdrawn. This quantity should be substantially equivalent to the second quantity of wine added during the process. The process of the invention can be repeated by successively adding and withdrawing a quantity of wine less than the amount added to initiate the process.

The process of the invention will now be described in greater detail by reference to a preferred fermentation apparatus in accordance with the invention.

Figure 1:
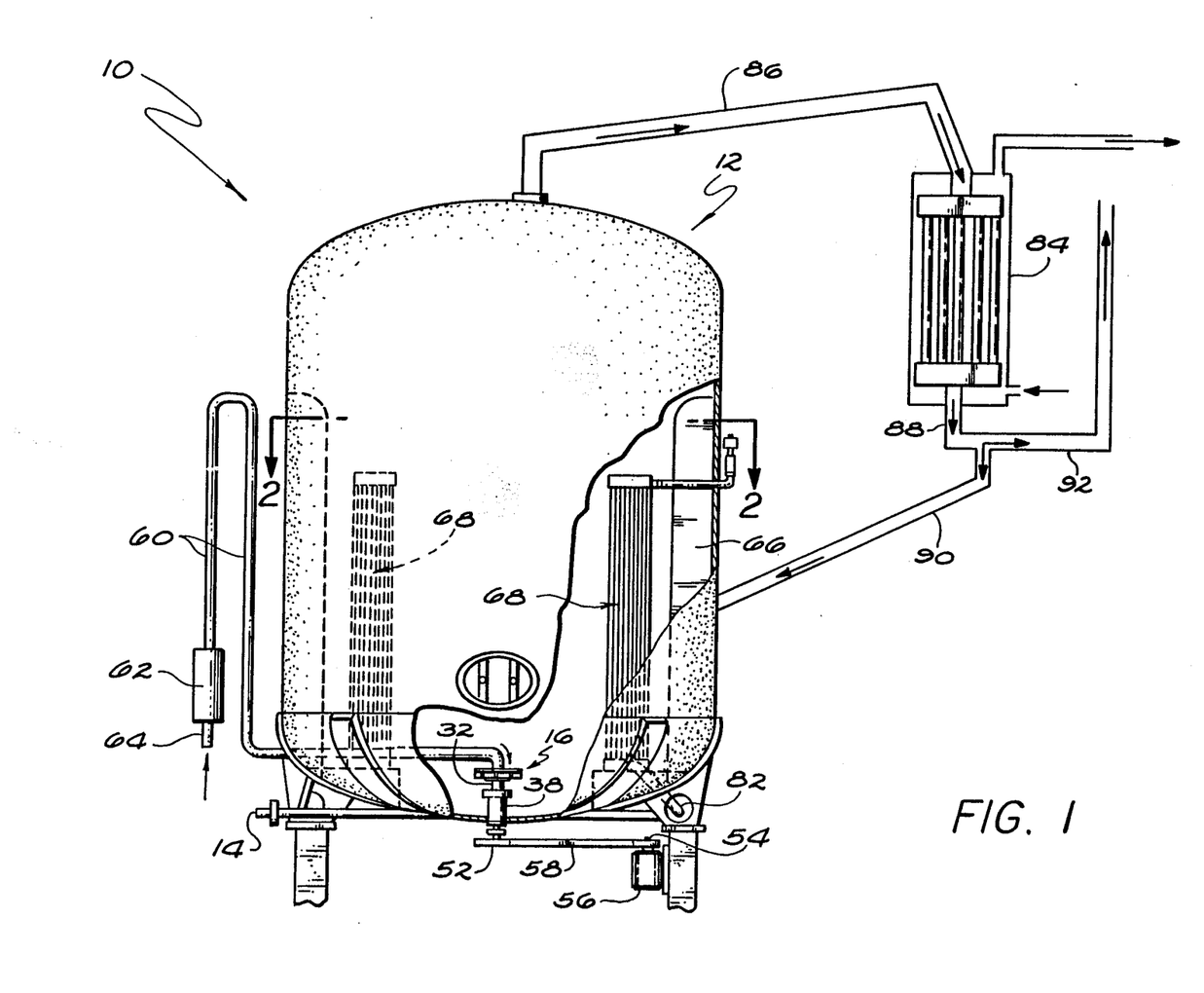
FIG. 1 is a side elevational view of a fermentation vessel partially sectioned away to expose the mechanisms of the invention disposed therein and schematically illustrating the interconnection between the vessel and the condenser in accordance with an embodiment of the invention.
Figures 2, 3:
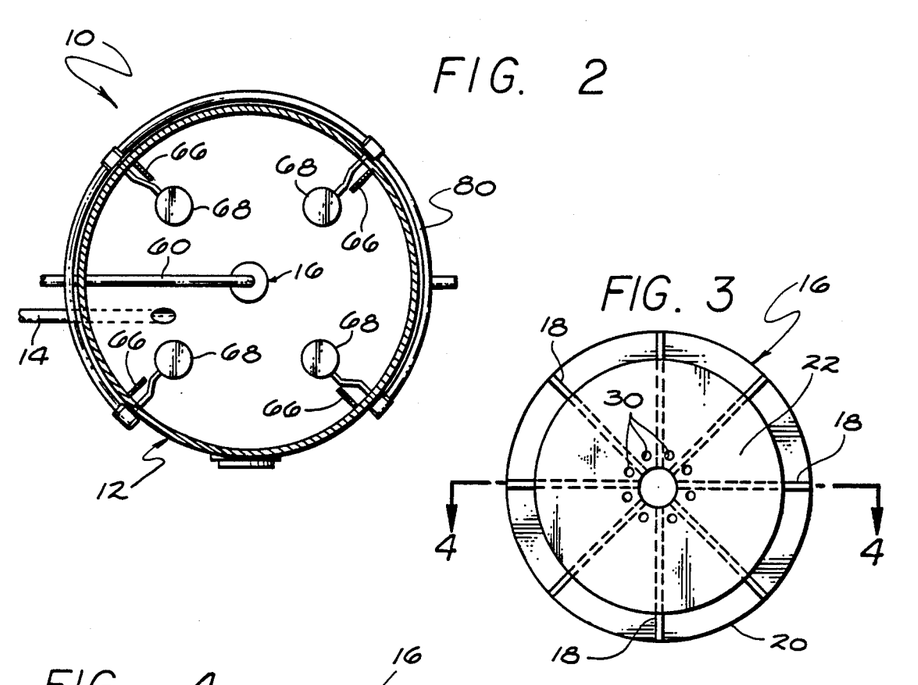
FIG. 2 is a sectional view of FIG. 1 along line 2—2.
FIG. 3 is a bottom view of a rotatable aerator impeller in accordance with an embodiment of the invention.

Referring now to FIGS. 1 and 2, a fermentation apparatus in accordance with the invention can be seen generally at 10. This fermentation apparatus 10 includes a vessel 12 into which a quantity of wine can be charged and/or discharged. The apparatus 10 further includes a mechanism for introducing air into the vessel 12 (shown as a rotatable impeller 16 and air line 60, both of which will be discussed more fully below) and a number of fins 66, which function to create a multidirectional circulation of the wine.

The components of the air introducing mechanism are at least partially disposed inside the vessel 12, while the fins 66 are completely positioned inside the vessel 12. The apparatus 10 further includes a condenser 84 which is interconnected fluidally to the vessel 12 by a number of feed lines (indicated generally at 86 and 90). The condenser 84 provides for the return of substantially all of any ethanol and/or acetic acid in the exhaust gas to the wine in the vessel 12. This vessel 12 is typically a sealed substantially elongated cylindrical hollow receptacle. Generally, the vessel 12 will be positioned so that its greatest length is vertically oriented, as illustrated in FIG. 1.

A quantity of wine can be charged and discharged into the vessel 12 through a conduit 14. The conduit 14 is positioned to communicate with the lowermost point of the vessel 12. This ensures that in the succeeding fermentations the newly added wine will be subjected to aeration immediately as it is being introduced into the vessel 12. As stated, the air is introduced into the wine through the rotatable impeller 16.

Figures 4, 5:
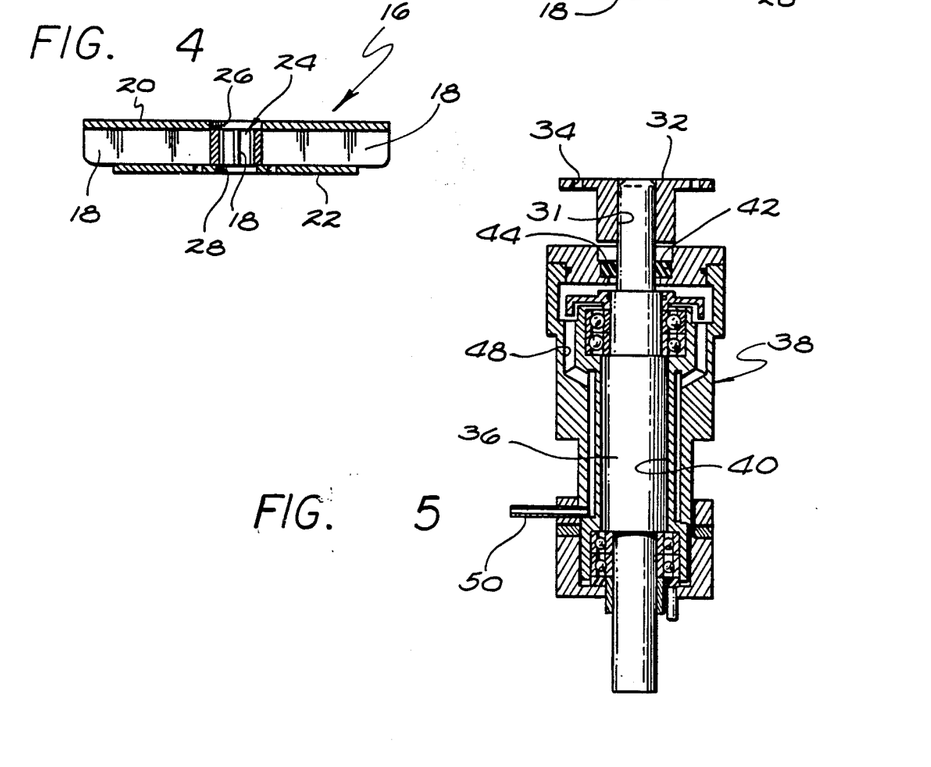
FIG. 4 is a side view of the aerator impeller illustrated in FIG. 3.
FIG. 5 is a cross-sectional view of the impeller, a rotatable axle and housing unit to which the aerator impeller, illustrated in FIGS. 3 and 4, is secured.

Referring now to FIGS. 3 and 4 simultaneously, a preferred rotatable impeller 16 will now be described in greater detail. The impeller 16 includes a number of vertically orientated blades 18 which are sandwiched and secured between a pair of plates, indicated generally at 20 and 22. The diameter of plate 22 is illustrated as less than that of plate 20. The blades 18 are disposed in vertical planes which are axisymmetrical position from each other and extend radially outward from the axis about which the impeller 16 will be rotated. The blades 18 do not extend completely to the impeller 16 axis of rotation. This provides for an open area 24 between the innermost ends of the various blades 18. As will be described herein, air is directed into this open area 24. Furthermore, both of the plates 20 and 22 are provided with substantially coaxial apertures 26 and 28 which provide for a substantially coaxial passageway through the impeller 16 in combination with the open area 24. Formed about the aperture 28 of the plate 22 are a plurality of bolt holes, generally indicated at 30, for use in securing this plate 22 to a mechanism for rotating the impeller 16.

The manner of providing the rotation of the impeller 16 will now be described. The impeller 16 is rotated by a shaft (indicated at 36 in FIG. 5). The shaft 36 and impeller 16 are secured to each other by a collar 32. As seen in FIG. 5, the collar 32 possesses a number of bolt holes, generally indicated at 34 which are alignable with the bolt holes 30 of the plate 22. Individual bolts, not shown, are provided through these bolt holes 30 and 34 when aligned to secure the collar 32 to the plate 22. The collar 32 is now coupled to the end of the shaft 36 by forming the collar 32 with a bore 31 for receiving the end of the shaft 36. A key screw, not shown, which passes through the body of the collar 32, engages the surface of the shaft 36 thus securing the collar 32 and the impeller 16 to the shaft 36.

The shaft 36 is rotatably mounted in a shaft housing 38. As seen in FIG. 1, this housing 38 partially extends into the interior of the vessel 12 through an aperture, not shown. The area about the shaft housing 38 positioned through this aperture is sealed in any suitable manner to prevent leakage of the wine.

Referring again to FIG. 5, the shaft 36 is rotatably disposed in a housing bore 40. The precise construction of the shaft housing 38 is not critical to the invention and thus will not be discussed in any detail herein. However, the shaft 36 should be mounted in the housing 38 to minimize oscillating of the shaft 36 in and out of the housing 38. This is provided by the proper fitting of the shaft 36, which is formed with regions of varying diameters, into the housing bore 40, which also has corresponding dimensioned regions. Furthermore the shaft 36 is long enough, in relation to the shaft housing 38, to allow the opposite ends of the shaft 36 to extend out of the shaft housing 38.

Furthermore, the interior of the housing 38 is sealed from the fermenting wine in the vessel 12 by providing a seal about the end of the shaft 36 which extends out from the housing 38 into the vessel 12. Specifically, that end of the housing 38 through which the shaft 36 extends is formed with a seal receiving recess 42. Snugly received in this recess 42 is a first porcelain ring seal 44 upon which a second carbon comprised ring seal 46 is placed. Positioned between the porcelain seal 14 and the carbon seal 46 is a rubber gasket, to which an adhesive is applied. In this manner the seals 44 and 46 which are secured in the recess 44 about the shaft 36 provide an effective seal against the introduction of the fermenting wine into the housing 38. This is necessary since the fermenting wine may corrode the shaft 36 and impair the function of aerating the wine. In order to minimize the possibility of damage to the shaft 36, the housing 38 is formed with a passageway through which wine, which may leak past these seals 44 and 46 will be trapped, generally indicated at 48. This passageway 48 exits the housing 38 at a port 50, which is exteriorly positioned on the vessel 12. Thus any leakage into the housing 38 by the wine can be observed and the process sufficiently terminated in enough time to replace these seals and minimize damage to the shaft 36.

Referring back again to FIG. 1, the shaft 36 and thus the impeller 12 can be rotated by any suitable means. As illustrated, a shaft pulley 52 is secured about the end of the shaft 36 extending out from the housing 38 positioned exteriorly of the vessel 12. A second pulley 54 is secured to a rotating shaft of a motor 56. The rotation of the pulley 54 is transferred to the pulley 52, and thus the shaft 36 and impeller 16, by a belt 58. In accordance with a preferred embodiment of the invention, the impeller 16 will be rotated at about 1000 revolutions per minute (rpm). As illustrated in FIG. 1, the shaft pulley 52 is larger in diameter than the pulley 54. For illustratove purposes, the pulley 54 may have a diameter of 150 millimeters with the pulley 52 having a diameter of 300 millimeters. The pulley 54 is driven at about 2400 rpms which is converted by the rotation of the pulley 52 to 1000 rpms by this difference of diameters. It should be noted that a drive motor may be coupled directly to the shaft 36.

As stated above, air is introduced into the wine by the impeller 16 and feed line 60. This line 60 directs a stream of air into the open area 24 of the impeller 16 through the aperture 26 of the plate 20. That is that end of the line 60 positioned in the vessel 12 is positioned in alignment with or directly in the aperture 26 of the plate 20. The air directed through this line 60 is compressed by a compressor, generally indicated at 62, sufficiently enough to provide a desired flow rate of air at four meters $^3$ per every 1000 liters of wine per hour. The air is drawn into the line 60 by the compressor 62, which is placed in line with the line 60, by the line open end 64.

Thus in oeprating the described aerating mechanism, air is drawn through the air line open end 64, compressed sufficiently by the compressor 62 to provide the desired flow rate and directed to the open area 24 of the impeller 16. The impeller 16, which is being rotated at a desired rate will then deliver this air into the wine in a generally rotational direction out from its periphery.

This rotational discharge of the air establishes a generally upwardly spiralling circulation in the wine. As discussed above, the overall circulation of the wine within the vessel 12 is multidirectional.

This multidirectional circulation is accomplished by positioning a number of fins 66 in the vessel 12. These fins 66 are placed along the vertical walls of the vessel 12 to provide a substantially flat surface opposing the direction of the spiralling circulation of the wine in the vessel 12. As shown in FIG. 2, it is preferred that four of these fins 66 be provided axisymmetrically about the interior vertical surfaces of the vessel 12. In this manner, these fins 66 are disposed in planes that vertically radiate substantially outward from the axis or centerline of the vessel 12. The upwardly spiralling wine engages the respective fins 66 and will be deflected substantially radially inward. This creates a multidirectional circulation of the wine in the vessel 12, which in combination with the desired flow rate of the gas being introduced into the vessel 12 ensures a substantial saturation of the wine with the gas. This provides the desired fermentation rate by the production of a sufficient concentration of bacteria in the wine.

Further positioned in the vessel 12 are a number of heat exchange units 68. These heat exchange units 68 are positioned adjacent the radially innermost edges of the fins 66, as seen in FIG. 2. This provides that the wine will be directed to the heat exchange units 68 by the fins 66. These heat exchange units 68 will maintain the wine in the vessel 12 at a temperature less than or equal to about 35° C.

Figure 6:
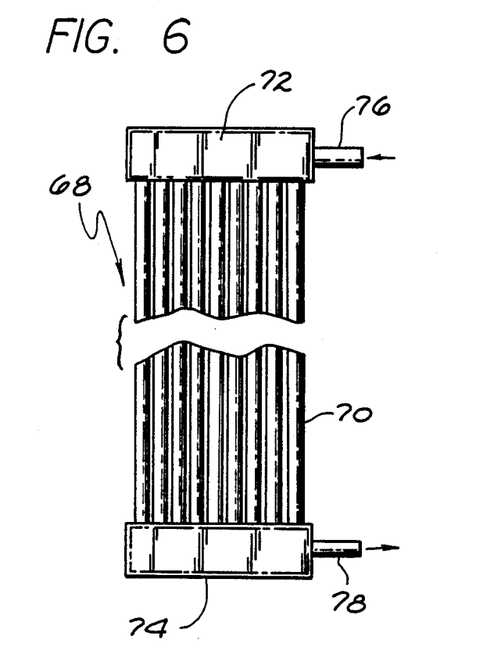
FIG. 6 is a side view of a partially sectioned cooling radiator in accordance with an embodiment of the invention.
Figure 7:
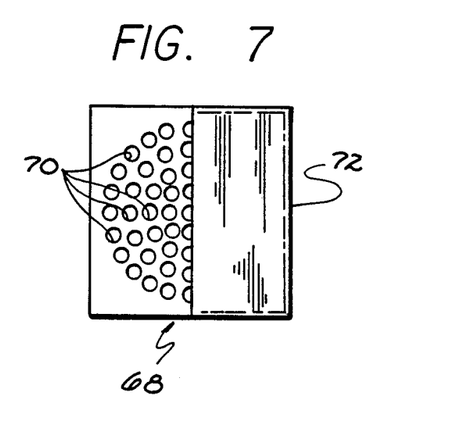
FIG. 7 is a top view of the cooling radiator illustrated in FIG. 6 with the top wall partially removed to expose the internal pipe configuration.

Referring now more particularly to FIGS. 6 and 7, the preferred heat exchange units 68 will be described in greater detail. Each heat exchange unit 68 includes a multiplicity of pipes 70. These pipes 70 are hollow with open oppsite ends. Each open end of each pipe 70 is secured and opens into a respective enclosure 72 or 74. As seen in FIG. 7, the openings of the individual pipes 70 are exposed in these respective housing. That is, each housing 72 and 74 is provided with a number of apertures in which the ends of the individual pipes are sealably mounted. The interface between the housings and the pipe surfaces are sealed against fluid leakage. A coolant liquid is directed through the heat exchange units 68 by introducing the liquid into the enclosure 72 through a port pipe 76. The fluid then flows through the enclosure 72, down the individual pipes 70 and out of the enclosure 74 through an outlet port pipe 78.

As illustrated in FIG. 1, the heat exchange units 68 are positioned in the vessel 12 with the pipes 70 in a vertical orientation. In this manner, as the wine is deflected radially inward off of the adjacent fin 66, the wine will flow between and about the pipes 70. This provides an efficient cooling of the wine. The coolant is introduced to each unit 68 by a supply line 80 and exits from each heat exchange unit 68, out of the vessel 12, via a discharge line 82 (shown in phantom in FIG. 1).

As stated above, as the wine becomes saturated with the gas, excessive gas will evaporate off of the wine. This excessive or "exhaust" gas will also carry out of the wine some of the ethanol and/or acetic acid from the wine. In accordance with the invention, this exhaust gas is acted upon to return substantially all of any ethanol and/or acetic acid carried by this exhaust gas in vapor or liquid form to the fermenting wine in the vessel 12. This return of the ethanol and/or acetic acid to the wine with the vessel 12 is accomplished by the use of the condenser 84.

The condenser 84 is positioned exteriorly of the vessel 12. A line, shown schematically at 86 opens at the upper end of the vessel 12 to receive the upwardly rising exhaust gas. This line 86 then delivers the exhaust gas to the condenser 84, wherein the gas is acted upon to separate out substantially all of any ethanol and/or acetic acid present therein. The ethanol and/or acetic acid is converted back into the liquid state, passes out of the condenser 84 to a return line 88 which delivers this liquid to the vessel 12 through a return line branch 90. A second branch 92 allows the escape of any remaining exhaust gas to the atmosphere.

Figure 8:
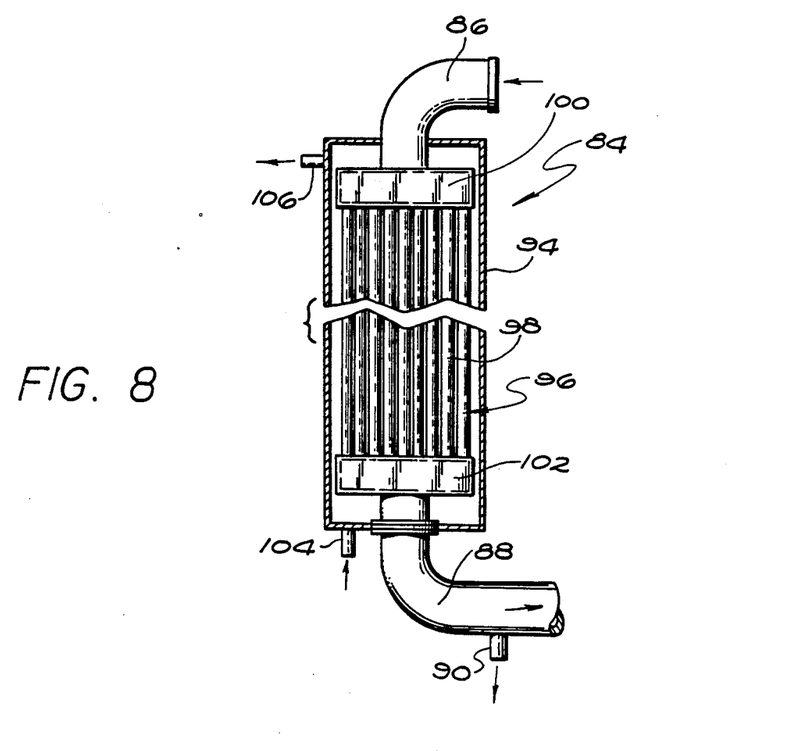
FIG. 8 is a cross-sectional view of a condenser in accordance with an embodiment of the invention.

Referring now to FIG. 8, a preferred embodiment of the condenser 84 will be discussed now in greater detail. The condenser 84 includes an outer jacket 94 which forms an enclosure about a radiator unit 96. The radiator 96 includes a number of pipes 98 positioned longitudinally in the jacket 94 with their respective open ends sealably mounted in housings 100 and 102, with housing 102 being at the condenser 84 lower end. The exhaust gas passes from the housing 100 through the pipes 98 to the housing 102. The exhaust gas is delivered to the housing 100 through the delivery line 86 and exits out of the housing 102 through the return line 88. Both the delivery and return lines 86 and 88 pass through apertures provided in the jacket 94, with the interface between the jacket 94 and the respective of lines 86 and 88 sealed against fluid leakage in a suitable manner. A coolant liquid is introduced into the jacket 94 through an inlet port line 104, passes up through the jacket 94 about the housings 100 and 102 and pipes 98 and exits through an outlet port line 106.

In this manner, as the exhaust gas passes through the various pipes 98 the gas is sufficiently cooled to a desired temperature to condense out of the exhaust gas substantially all of any present ethanol and/or acetic acid. Typically, the coolant liquid directed through the jacket 94 is at a temperature less than about 10° C., preferably from about 0° to 10° C., more preferably 5° to about 10° C. and even more preferably about 10° C. Thus in accordance with the invention, the exhaust gas, which evaporates off and out of the wine, is directed to and through the condenser 84 with substantially all of any ethanol and/or acetic acid present in the exhaust gas being condensed out and returned to the wine in the vessel 12. The remaining exhaust gas exits the condenser 84 and apparatus through the return line branch 92.

Referring back again to FIG. 1, the process of the invention will be discussed in greater detail with reference to the operation of apparatus 10. In accordance with one illustrative embodiment of the invention, the vessel 12 is formed to contain at least 14,000 liters of wine. In accordance with this illustrated embodiment, a first defined quantity of wine is introduced into the vessel 12 equal to about 8000 liters through the conduit 14. The conduit 14 is then sealed by any suitable means to prevent backflow of the wine. The process of the invention is initiated by activating the operation of the aeration and circulation of the wine in the vessel 12. This involves activating the motor 56 which, through the pulleys 52 and 54, rotates the impeller 16 at a desired 1000 rpms. Concurrently or subsequent to the activation of the impeller 16, the compressor 62 is activated.

The compressor 62 draws into the feed line 60 outside air through the open end 64. The compressor 62 compresses this air sufficiently to deliver the air, through the conduit 60, to the rotating impeller 16 at required rate of four meters$^3$ per 1000 liters of wine per hour. In this manner the air is discharged from about the periphery of the impeller 16 in a rotating direction. This causes the wine in the vessel 12 to begin to circulate in an upwardly spiralling direction. As the wine spirals upward in the vessel 12 it comes into engagement with the various fins 66. The motion of the wine is obstructed and diverted by these fins 66 substantially radially inward. As the wine comes off of the various fins 66 and intermixes with the upperly spiralling body of wine a multidirectional circulation of the wine is created providing for a uniform mixing of the wine and the air.

The wine becomes substantially saturated with the air after the lapse of a short period of time after the aeration is initiated. This induces the growth of any resident bacteria present in the wine. As this bacterial growth continues, fermentation of the ethanol of the wine is initiated. As already discussed, this oxidation is an exothermic reaction which begins to heat the wine in the vessel 12. Either at an appropriate period of time after the initiation of or substantially concurrent with the initiation of the aeration, a coolant liquid is directed through the heat exchange units 68. As the wine passes off the individual fins 66 it is directed through the pipes 70 of each heat exchange unit 68 and is cooled. This maintains the wine at a temperature equal to or less than about 35° C. In order to properly maintain the wine at this temperature, the temperature of the coolant being directed through each heat exchange unit 68 should be sufficient to cool the quantity of wine being circulated in the vessel 12.

As the fermentation process continues, exhaust gas will evaporate off and out from the surface of the wine. This exhaust gas will be directed into and through the condenser 84 via line 86. As the exhaust gas passes through the condenser 84, it is cooled to condense out substantially all of any present ethanol and or acetic acid. The now condensed out ethanol and acetic acid is returned to the wine in the vessel 12 through the return line branch 90.

It has been determined that the 8000 liters of wine subjected to the process according to the discussed operational parameters of the apparatus 10, will be substantially fermented in a time period of from about four to about six days. That is, after about four to about six days, the volume percent concentration of the ethanol remaining in the wine will be about 0.3. This volume percent represents, as stated above, that the maximum concentration of bacteria is present to achieve rapid fermentation of any additionally provided wine. This concentration level can be determined by analyzing the exhaust gas passing through the line 86. This can be accomplished by bleeding off from the line 86, in any suitable manner, a sufficient amount of exhaust gas which is then analyzed.

After the wine in the vessel 12 becomes substantially fermentated, preferably when the ethanol level reaches about 0.3 volume percent, a second lesser quantity of wine is introduced into the vessel 12 through the conduit 14. This second lesser quantity of wine for this illustrative embodiment is about 6000 liters. This additional 6000 liters of wine is introduced gradually into the vessel 12 so as not to substantially impair the aeration and cooling of the wine. That is, the additional wine is added into the vessel 12 in such a manner that the total wine in the vessel 12 will remain substantially saturated with the air and be at a temperature of less than or equal to about 35° C.

After the additional wine has been introduced into the vessel 12, a second calculated period of time is allowed to transpire. After such period of time a quantity of now substantially fermented wine substantially equivalent to the second amount added is removed from the vessel 12 through the conduit 14. Again, this second period of time transpires after the desired degree of fermentation of the ethanol to the acetic acid is substantially complete. Again, preferably when the ethanol concentration is at about 0.3 volume percent. In accordance with this illustrative embodiment, the 6000 additional liters of wine will have reached this point after about 24 hours. After the withdrawal from the vessel 12 of about 6000 liters of wine a successive introduction and removal of additional wine in an amount of 6000 liters can be performed in a like manner. Again, the time for completing these successive fermentations of the additional 6000 liters of wine will remain at about 24 hours. In this manner, successive batches of 6000 liters of wine can be subjected to oxidative fermentation in substantially equivalent time frames. This minimizes the attentiveness which muct be paid to the overall process, thus reducing labor costs.

In accordance with another illustrative embodiment of the invention, the first defined quantity of wine introduced into the vessel 12 is about 3000 liters with the second and succeeding quantities of wine being about 1500 liters.

It should be noted that these two described illustrative embodiments are dependent upon the operational parameters described herein for the apparatus 10. The apparatus and process of the invention can be utilized for varying quantities of wine by varying the revolutions per minute of the impeller 16 until a first calculated period of time is achieved from about four to six days or any other desired time period, and a second calculated period of time of about 24 hours, or other desired period of time is achieved.

It should also be noted that the second quantity of the wine added to the process should always be less than the initial. This, as stated above, ensures for a rapid fermentation of the second quantity of wine. As apparent to those of ordinary skill in the art, the precise quantity of this added wine may vary depending upon the desired frame time desired to complete the fermentation. Less additional wine means less time. However, the preciose time for a given quantity added is calculated by measuring the time from the point of addition until the desired degree of fermentation is achieved, preferably when the ethanol concentration is about 0.3 volume percent.

While the preferred embodiments have been described and illustrated, various mdifications and substitutions may be made thereto without departing from the scope of the invention. Accordingly, it is to be understood that the present invention has been described by way of illustration and not limitation.

What is claimed is:

1. An acetic acid fermentation apparatus comprising:
    a substantially enclosed receptacle which can be partially filled with wine.
    port means through which said wine charged to and/or discharged from said receptacle;
    temperature regulating means interiorly positioned said receptacle for maintaining said wine below a desired temperature during the fermentation of said wine;
    aerating means for impregnating and dispersing an oxygen-bearing gas into said wine at a predefined gas flow rate and in a multidirectional circulation flow sufficient enough to substantially saturate said wine with said gas; and
    condensing means for returning to said wine in said receptacle substantially all of any vaporized and/or entrained ethanol and acetic acid carried by any exhaust gas coming off of said wine.

2. The apparatus of claim 1 wherein said condensing means returns said vaporized and/or entrained ethanol and/or acetic acid by substantially cooling said exhaust gas to a sufficient enough temperature.

3. The apparatus of claim 1 wherein said condensing means comprises:
    a multiplicity of tubular conduits through which said exhaust gas can be directed;
    means for directing said gas through said conduits;
    cooling jacket means at least partially enclosing said conduits for cooling said conduits to a sufficient enough temperature to cause the condensing of said ethanol and/or acetic acid out of said exhaust gas; and
    means for capturing and charging said condensed ethanol and/or acetic acid to said wine in said receptacle.

4. The apparatus of claim 3 wherein said temperature is less than about 10° C.

5. An acetic acid fermentation apparatus comprising:
    a substantially elongated and enclosed hollow tubular receptacle which can be at least partially filled with wine;
    port means through which said wine is charged to and/or discharged from said receptacle;
    temperature regulating means interiorly positioned said receptacle for maintaining said wine below a desired temperature during the fermentation of said wine;
    gas delivery means interiorly positioned said receptacle at a location to ensure submersion below substantially all of said wine in said receptacle for impregnating said wine with an oxygen-bearing gas at a flow rate of 4 meter$^3$ per 1000 liters of wine per hour and in a substantially outwardly rotating manner to establish in said wine a substantially upwardly spiralling circulating flow;
    dispersal means interiorly positioned said receptacle formed to provide at least a first surface vertically oriented in relation to the direction of said wine spiralling circulation for impeding and diverting said spiralling circulating flow of said wine substantially radially inward said receptacle to establish in said wine a multidirectional circulation flow, and for directing said spiralling wine to said temperature regulating means; and
    condensing means for returning to said wine in said receptacle substantially all of any vaporized and/or entrained ethanol and/or acetic acid carried by any exhaust gas coming off of said wine.

6. The apparatus of claim 5 wherein said dispersal means comprises a plurality of substantially planar members extending out from said receptacle.

7. The apparatus of claim 6 wherein said temperature regulating means comprises at least a first heat-transfer means positioned radially inward and adjacent at least a first of said planar members for cooling said composition to maintain said desired temperature.

8. The apparatus of claim 7 wherein said condensing means returns said vaporized and/or entrained ethanol and/or acetic acid by substantially cooling said exhaust gas to a sufficient enough temperature.

9. The apparatus of claim 5 wherein said dispersal means comprises four substantially planar members, each having first and second substantially flat opposing surfaces, extending out from and axissymmetrically disposed about said receptacle interior surfaces.

10. The apparatus of claim 9 wherein said planar members traverse a substantial portion of said receptacle interior surface.

11. The apparatus of claim 9 wherein said temperature regulating means comprises four heat-transfer means, each of which, are positioned radially inward and adjacent one of said planar members for cooling said composition to maintain said desired temperature.

12. The apparatus of claim 11 herein said heat-transfer means comprises a multiplicity of substantially tubular conduits through which a liquid can be directed, all of said conduits being positioned in a substantially parallel orientation to said adjacently disposed planar member and a means for directing said liquid through said conduits while isolating said liquid from said wine in said receptacle, and a means for cooling said wine to a sufficient enough temperature to maintain said wine at said desired temperature.

13. The apparatus of claim 12 wherein said condensing means returns said vaporized and/or entrained ethanol and/or acetic acid by substantially cooling said exhaust gas to a sufficient enough temperature.

14. The apparatus of claim 13 wherein said condensing means comprises:
   a multiplicity of tubular conduits through which said exhaust gas can be directed;
   means for directing said gas through said conduits;
   cooling jacket means formed to at least partially surround and isolate said conduits interior portions from a cooling liquid which can be circulated through said jacket means about said conduits, said conduits through which liquid for cooling said conduits to a sufficient enough temperature to cause the condensing of said ethanol and/or acetic acid out of said exhaust gas; and
   means for capturing and charging said condensed ethanol and/or acetic acid to said composition in said receptacle.

15. The apparatus of claim 14 wherein said gas delivery means comprises a rotatable impeller having a multiplicity of substantially planar vertically orientated blades secured in a outwardly radiating pattern between two plates, and wherein said gas delivery means further comprises a means for directing a flow of said gas substantially coaxially between blades.

16. The apparatus of claim 15 wherein said blades of said impeller means are sandwiched and secured between first and second substantially planar plates, at least a first of said plates formed to provide an aperture substantially coaxial with said blades axis, and wherein said gas flow directing means comprises a conduit having a first end alignably positioned at or in said first plate aperture and a second end exteriorly disposed of said receptacle connected to a source of compressed air to provide said predefined flow rate.

* * * * *